United States Patent
Lin et al.

(10) Patent No.: US 11,678,642 B2
(45) Date of Patent: Jun. 20, 2023

(54) PET CARRIER

(71) Applicant: Doskocil Manufacturing Company, Inc., Arlington, TX (US)

(72) Inventors: Charles Lin, Zhongshan (CN); Jack Renforth, Azle, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 69 days.

(21) Appl. No.: 17/141,502

(22) Filed: Jan. 5, 2021

(65) Prior Publication Data

US 2021/0259199 A1 Aug. 26, 2021

Related U.S. Application Data

(60) Provisional application No. 62/981,237, filed on Feb. 25, 2020.

(51) Int. Cl.
*A01K 1/02* (2006.01)

(52) U.S. Cl.
CPC .......... *A01K 1/0272* (2013.01); *A01K 1/0254* (2013.01)

(58) Field of Classification Search
CPC ...... A01K 1/0272; A01K 1/0254; A01K 1/03; A01K 1/0281; A01K 1/029; A01K 31/07
See application file for complete search history.

(56) References Cited

U.S. PATENT DOCUMENTS

| | | | |
|---|---|---|---|
| 5,005,526 A * | 4/1991 | Parker | A01K 1/0272 119/751 |
| 5,170,745 A | 12/1992 | Burdette | |
| 5,671,698 A * | 9/1997 | Farrugia | A01K 1/0254 119/497 |
| D398,083 S * | 9/1998 | Martz | D3/273 |
| 5,941,195 A * | 8/1999 | Martz | A45F 3/04 119/497 |
| 6,155,206 A * | 12/2000 | Godshaw | A01K 1/0254 119/453 |
| 6,286,461 B1 | 9/2001 | Martz | |
| 7,210,426 B2 | 5/2007 | Yeung | |

(Continued)

FOREIGN PATENT DOCUMENTS

EM 001215248-0040 11/2012
JP 2004217173 A 8/2004

(Continued)

OTHER PUBLICATIONS

Petego; Petego ISOFIX—Latch Connection for Jet Set Carriers, webpage, unknown publication date.

(Continued)

*Primary Examiner* — Monica L Perry

(74) *Attorney, Agent, or Firm* — Global IP Counselors, LLP

(57) ABSTRACT

A carrier for an animal includes a plurality of panels, a wire frame, a clip and an iso clip. The plurality of panels are configured to form a hollow enclosure for housing the animal. The wire frame supports at least one of the panels so as to maintain the shape of the enclosure. The clip is on a front surface of the carrier, and configured to receive a belt portion of a seat belt of a vehicle. The iso clip is on at least one of a rear surface and a bottom surface of the carrier, and configured to couple to an iso anchor of the vehicle.

17 Claims, 18 Drawing Sheets

(56) References Cited

U.S. PATENT DOCUMENTS

| | | | |
|---|---|---|---|
| D575,461 S | 8/2008 | Cannon | |
| 7,487,744 B1 * | 2/2009 | Goldberg | A01K 31/07 119/482 |
| 7,789,044 B2 * | 9/2010 | McGrade | A01K 1/0254 119/498 |
| D649,719 S * | 11/2011 | Siklosi | D30/109 |
| 8,230,818 B2 | 7/2012 | Pietra | |
| 8,584,618 B1 * | 11/2013 | Batson | A01K 1/0272 119/496 |
| 8,714,111 B2 * | 5/2014 | Bryson | A01K 1/0245 119/482 |
| 9,226,473 B2 * | 1/2016 | Hoffman | A01K 1/0035 |
| 9,392,766 B1 | 7/2016 | Elden | |
| 9,485,957 B2 * | 11/2016 | Kellogg | A01K 1/034 |
| D804,738 S | 12/2017 | Nourollah | |
| 9,849,838 B1 * | 12/2017 | Siciliano | B60R 11/00 |
| 10,772,288 B1 * | 9/2020 | Sandiford | A01K 1/0272 |
| 2003/0127058 A1 * | 7/2003 | Sletten | A01K 1/0254 119/496 |
| 2003/0127060 A1 * | 7/2003 | Yeung | A01K 1/0254 119/497 |
| 2004/0016409 A1 * | 1/2004 | Schwinghammer | A01K 1/0272 119/453 |
| 2004/0194723 A1 * | 10/2004 | Farmer | A01K 1/0254 119/474 |
| 2006/0278173 A1 | 12/2006 | Kamijo | |
| 2007/0102253 A1 * | 5/2007 | Godshaw | A01K 1/0254 190/102 |
| 2007/0131568 A1 * | 6/2007 | Georgia | A45C 13/02 206/234 |
| 2007/0193522 A1 | 8/2007 | Greschler | |
| 2008/0011234 A1 * | 1/2008 | Wilkes | B60R 7/043 119/28.5 |
| 2008/0066689 A1 * | 3/2008 | Martz | A01K 1/0254 119/497 |
| 2008/0156275 A1 | 7/2008 | Lam | |
| 2008/0216760 A1 | 9/2008 | Cannon et al. | |
| 2010/0000472 A1 * | 1/2010 | Siklosi | A01K 1/0272 119/497 |
| 2010/0126427 A1 * | 5/2010 | McGrade | A01K 1/0254 119/496 |
| 2010/0139573 A1 * | 6/2010 | Wilson | A01K 1/0272 119/496 |
| 2010/0288204 A1 * | 11/2010 | Costello | A01K 1/0272 119/453 |
| 2012/0186533 A1 | 7/2012 | Lu | |
| 2013/0213315 A1 * | 8/2013 | Dorfman | A01K 1/0272 119/752 |
| 2015/0047574 A1 * | 2/2015 | Jakubowski | A01K 1/0254 29/401.1 |
| 2015/0230424 A1 * | 8/2015 | Hartelius | B60R 22/10 248/505 |
| 2016/0057968 A1 | 3/2016 | Chandler | |
| 2018/0020636 A1 * | 1/2018 | Weerappuli | A01K 1/0272 119/453 |
| 2018/0359990 A1 | 12/2018 | Graham | |
| 2019/0104702 A1 * | 4/2019 | Edwards | A01K 1/0263 |
| 2019/0380299 A1 * | 12/2019 | Shewfelt | B60R 22/10 |
| 2020/0086823 A1 * | 3/2020 | Koop | A01K 27/002 |

FOREIGN PATENT DOCUMENTS

| | | |
|---|---|---|
| JP | D1434633 S | 2/2012 |
| JP | 2015096167 A | 5/2015 |

OTHER PUBLICATIONS

Unknown Author; electronic photograph of Petego ISOFIX—Latch pet carrier; unknown publication date.

GEN 7, INC; Gen 7 Commuter Pet Carrier & Car Seat, webpage, on or about Sep. 2017.

Unknown Author; KritterWorld Soft Side Pet Carrier Travel Bag; webpage, unknown publication date.

Unknown Author; Dog Cat Comfort Travel Crate Tote; Webpage unknown publication date.

Unknown Author; Pet Gear Carseat/Carrier; webpage; unknown publication date.

Unknown Author; Sherpa Deluxe Pet Carriers; webpage; unknown publication date.

* cited by examiner

PET CARRIER

RELATED APPLICATIONS

This application claims priority to U.S. Provisional Patent Application No. 62/981,237 filed on Feb. 25, 2020, which is hereby incorporated herein by reference.

BACKGROUND

Field of the Invention

The present application relates generally to the field of carrier devices for restraining an animal inside and outside of a vehicle. More specifically, the application relates to an improved carrier device which, in the vehicle, reduces potential injury to both the restrained animal and to vehicle occupants when the vehicle is subjected to a dynamic impact event, and outside the vehicle acts as a portable animal carrier device/kennel.

Background Information

Conventional carrier devices currently serve the primary purpose to restrain the movement of the animal while in-vehicle to limit distractions to the vehicle's driver (e.g., contacting the driver), which can arise from unrestricted animal movement. A secondary purpose of some carrier devices is to protect the interior of the vehicle from soilment by providing a surface that the animal is positioned on so that the animal does not contact the fabric of the interior.

Some systems have been constructed of quasi-rigid materials, such as injection molded polymers, having a steel grate door, commonly used for airport transportation of the animal. Other systems have been constructed of flexible materials, such as polymer mesh configurations, which can fold up for storage or for transporting the system without an animal.

Other conventional devices can include a harness or vest type device that is positioned around the chest of the animal and further includes a tether strap coupled on one end to the vest or harness and coupled on the other end to the seat (e.g., seat belt webbing or seat back).

SUMMARY

It has been determined that conventional carrier systems that can be coupled to the seatbelt or to the seatback of a vehicle seat have several disadvantages, at least some of which are as follows. First, these systems are not configured to be structural and are unable to withstand the forces generated by a dynamic vehicle impact. The quasi-rigid configurations can shatter from impact from the inertial force generated by the animal and from the reaction forces from the harnesses coupling the system to the seat assembly. The flexible configurations can yield through the meshing or tear along non-structural seams joining adjacent panels. The flexible configurations can therefore create in-vehicle debris (e.g., metal grate door) as well as allow the animal, during a dynamic event, to gain kinetic energy, both of which could injure vehicle occupants. Second, not being structural, these systems upon failure to restrain the animal during a vehicle dynamic impact event, will fail to restrain the animal following the impact. This can create other issues, such as impeding emergency medical responders from providing medical attention to injured vehicle occupants.

It has also been determined that the harness or vest type devices have several disadvantages. For example, many of these systems are not configured to be structural and are unable to withstand the forces generated by a dynamic vehicle impact. Moreover, if the animal is allowed even small amounts of slack from these systems, then during a (forward) vehicle dynamic impact the tether and harness cannot tear, but can allow the animal to displace toward a forward positioned occupant allowing enough displacement whereby the animal can contact the occupant or the seat of the occupant, potentially injuring the occupant and the animal. These devices also cannot restrain the animal following an impact event, potentially impeding emergency medical responders from providing medical attention to injured vehicle occupants.

It has been therefore determined that an improved pet carrier is desired, which is capable of passing crash testing within a vehicle. In view of the state of the known technology, a first aspect of the present disclosure is to provide a carrier for an animal includes a plurality of panels, a wire frame, a clip and an iso clip. The plurality of panels are configured to form a hollow enclosure for housing the animal. The wire frame supports at least one of the panels so as to maintain the shape of the enclosure. The clip is on a front surface of the carrier, and configured to receive a belt portion of a seat belt of a vehicle. The iso clip is on at least one of a rear surface and a bottom surface of the carrier, and configured to couple to the Isofix anchors of the vehicle.

A second aspect of the invention is to provide a carrier according to the first aspect that further comprises a strap configured to connect the carrier to the vehicle, the strap including a first fastening mechanism at a first end and a second fastening mechanism at a second end.

A third aspect of the invention is to provide a carrier according to the first or second aspect, wherein one of the first and second fastening mechanisms comprises a clip or a hook configured to connect to the carrier.

A fourth aspect of the invention is to provide a carrier according to any of the preceding aspects, wherein the wire frame is one of a plurality of wire frames and each wire frame of the plurality of wire frames is integrated into of one of the panels along a periphery of a respective panel.

A fifth aspect of the invention is to provide a carrier according to any of the preceding aspects, wherein at least one panel of the plurality of panels includes a porous material and a non-porous material and the porous material is configured to permit a flow of air into and out of the enclosure and to permit visibility of the animal disposed in the enclosure.

A sixth aspect of the invention is to provide a carrier according to any of the preceding aspects, wherein the porous material includes mesh fabric and the non-porous material includes nylon or polyester.

A seventh aspect of the invention is to provide a carrier according to any of the preceding aspects, wherein the wire frame comprises a wire or a rod.

An eighth aspect of the invention is to provide a carrier according to any of the preceding aspects, wherein the iso clip is attached to an adjustable strap.

A ninth aspect of the invention is to provide a carrier according to any of the preceding aspects, further comprising a door disposed in one of the plurality of panels and configured to enable the animal to enter and exit the carrier.

A tenth aspect of the disclosure is to provide a method of securing a carrier within a vehicle, the method comprising attaching an iso clip disposed on at least one of a rear surface and a bottom surface of the carrier to an iso anchor of the vehicle, securing a seat belt portion of the vehicle around a front panel of the carrier, and locking a clip on the front panel of the carrier to secure the seat belt portion to the carrier.

An eleventh aspect of the invention is to provide a method according to the tenth aspect, wherein the locking the clip includes rotating a locking arm so as to overlie the seat belt portion of the vehicle.

A twelfth aspect of the invention is to provide a method according to the tenth or eleventh aspect, further comprising connecting a strap of the carrier to the vehicle, the strap including a first fastening mechanism at a first end and a second fastening mechanism at a second end.

A thirteenth aspect of the invention is to provide a method according to any of the preceding aspects, wherein the front panel of the carrier includes a wire frame integrated into the front panel along a periphery thereof.

A fourteenth aspect of the invention is to provide a method according to any of the preceding aspects, wherein the wire frame comprises a wire or a rod.

A fifteenth aspect of the invention is to provide a method according to any of the preceding aspects, wherein the front panel includes a porous material and a non-porous material and the porous material is configured to permit a flow of air into and out of the enclosure and to permit visibility of the animal disposed in the enclosure.

A sixteenth aspect of the invention is to provide a method according to any of the preceding aspects, wherein the porous material includes mesh fabric and the non-porous material includes nylon or polyester.

A seventeenth aspect of the invention is to provide a method according to any of the preceding aspects, further comprising adjusting the iso clip with an adjustable strap.

An eighteenth aspect of the invention is to provide a method according to any of the preceding aspects, further comprising opening a door in a side panel to enable an animal to enter and exit the carrier As can be understood, the embodiments described herein enable a carrier to be securely and easily attached to a vehicle. The embodiments further provide an improved pet carrier, which is capable of passing crash testing within a vehicle, and that safely and securely protects the pet in vehicle collision and safely and securing restrains the pet to avoid any unwanted interference with the passengers of the vehicle and/or any safety or rescue personal, such as emergency medical responders providing medical attention to injured vehicle occupants, or any other person or persons entering the vehicle in any situation.

BRIEF DESCRIPTION OF THE DRAWINGS

The invention will be explained in more detail hereinafter with reference to the drawings.

DETAILED DESCRIPTION

Figure 1:
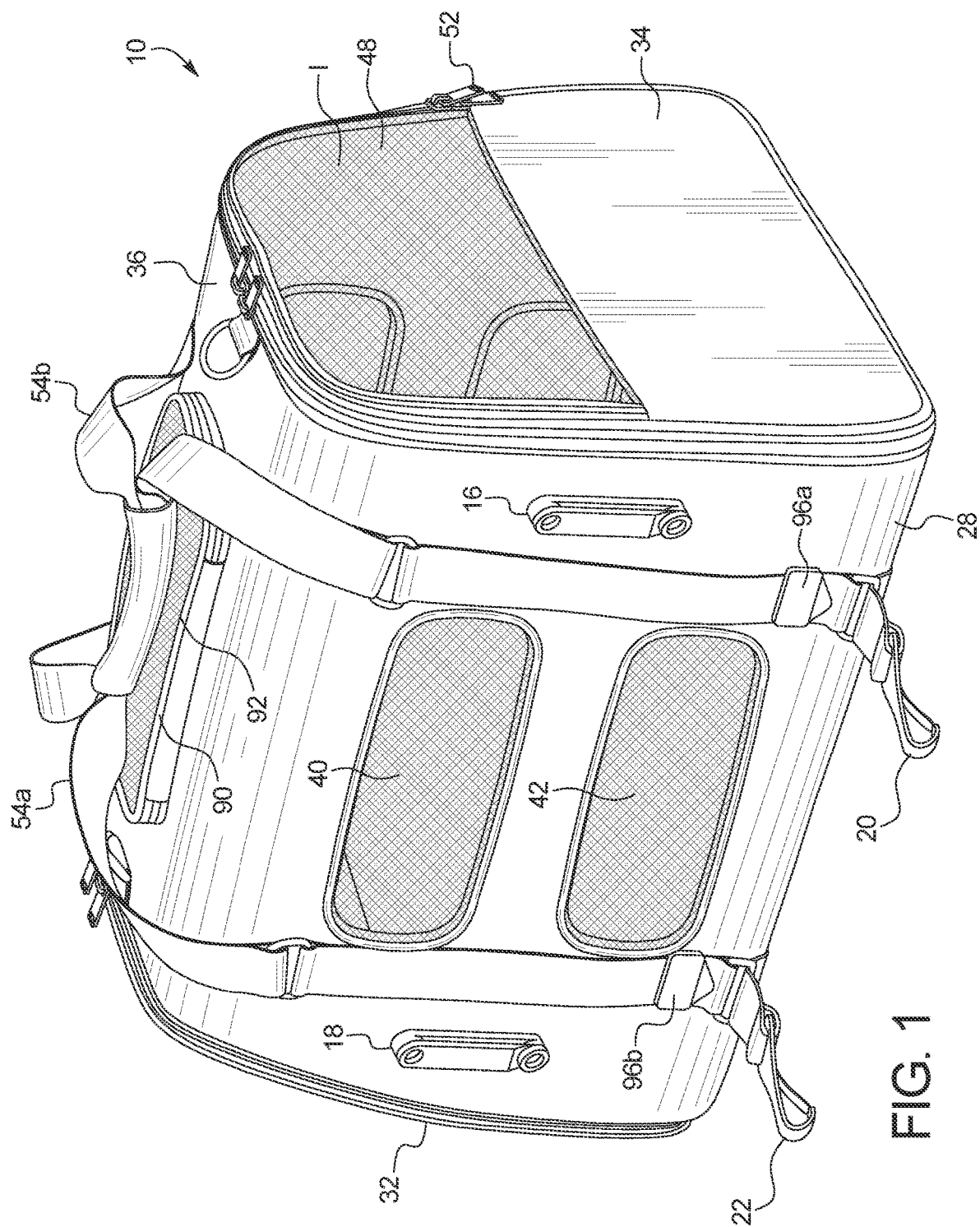
FIG. 1 is a top perspective of a pet carrier according to an embodiment of the present invention.
Figure 2:
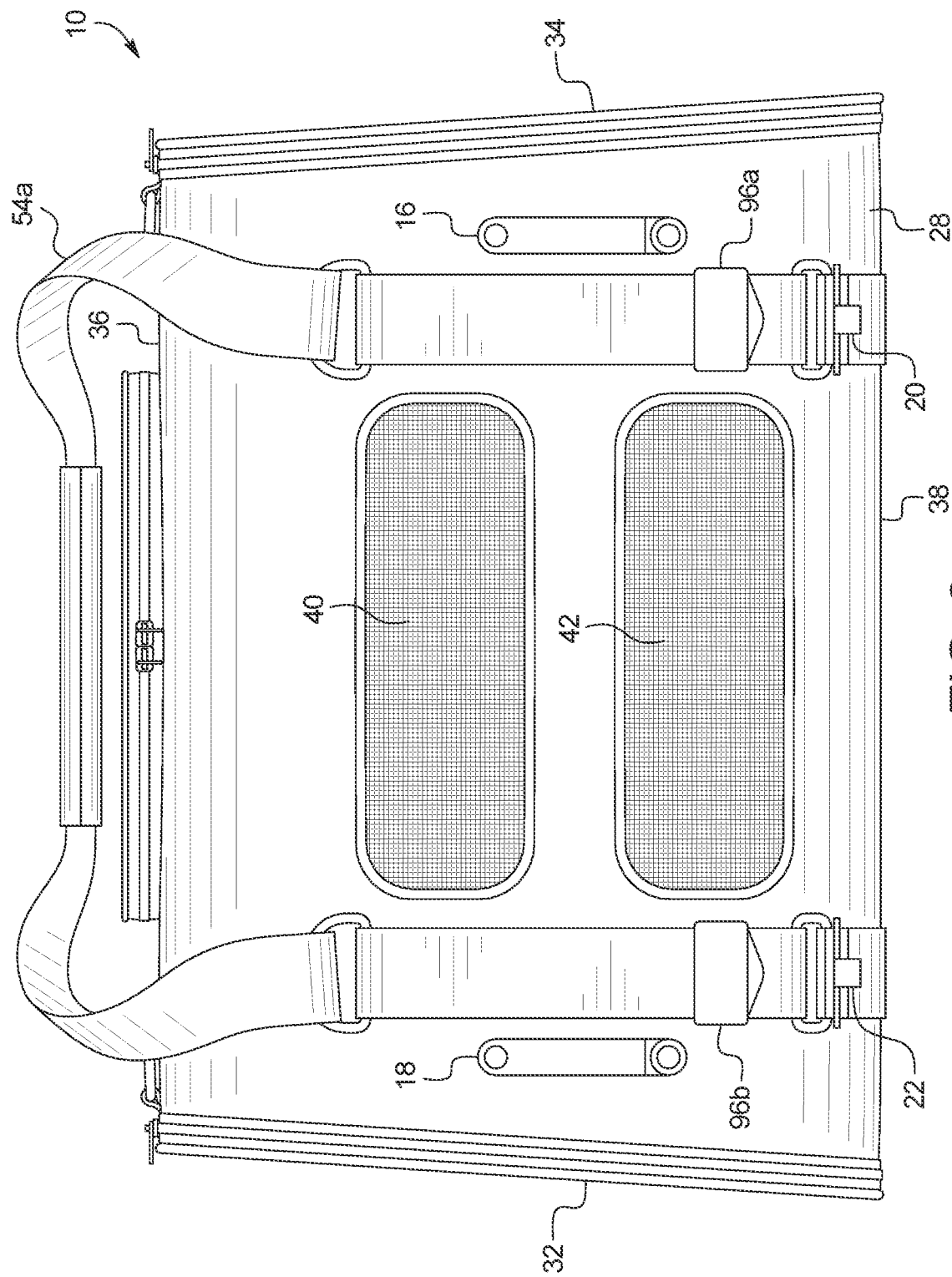
FIG. 2 is a front elevational view of the pet carrier of FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1-5, a pet carrier 10 is illustrated in accordance with a first embodiment. The carrier 10 can be configured to restrain an animal (e.g., pet P) inside and outside of a motor vehicle (not shown). When restraining the animal inside the vehicle, the carrier 10 can be connected to the Isofix anchors IA installed in a seat S of the vehicle. As can be understood, many vehicles include an Isofix system to which child seats can be connected. An Isofix system is generally understood to include several attachment points manufactured into cars, enabling compliant child safety seats to be quickly and safely secured. An Isofix system is an alternative to securing the child safety seat with seat belts SB. In some Isofix systems child safety seats can be secured with a single attachment at the top (top tether) and two attachments at the base of each side of the seat (i.e., isofix anchors IA). As described herein, embodiments of the present invention describe a carrier that is capable of being attached to at least the Isofix anchors IA in the vehicle.

In an embodiment, the carrier 10 can include a plurality of panels 12 configured to form a hollow enclosure or interior I for housing the pet P, a clip 16 or 18 that couples to a seat belt of the vehicle, and an ISO clip 20 (22, 24 or 26) configured to couple to at least one Isofix anchor IA of the vehicle. As illustrated in FIGS. 1-8, in one embodiment of the present invention, the plurality of panels of the carrier 10 includes a front side panel 28, a backside panel 30, a left end panel 32, a right end panel 34, a top panel 36 and a bottom panel 38 (left and right are determined from a view facing front side of the carrier 10). The carrier 10 can include mesh-like screens/egress structures. The front side panel 28 can include two centered screens 40 and 42, one over the other, the backside panel 30 can include two centered screens 44 and 46, one over the other. The top screens 40 and 44, if desired can include a zippered window egress structure. A pet P within the carrier 10 can access the interior I through the window egress structure and, if in some situations, can be placed in, and removed through, the top zippered mesh opening/window egress structure (i.e., screens 40 and 44). It is noted that for many pets, it is possible to place their head through the top zippered mesh opening/window egress structure, so that they can more clearly view their surroundings, feel less confined and can be petted and/or comforted. A pet can be leased to an interior leash (not shown) to restrain the pet within the carrier, if desired.

Figure 3:
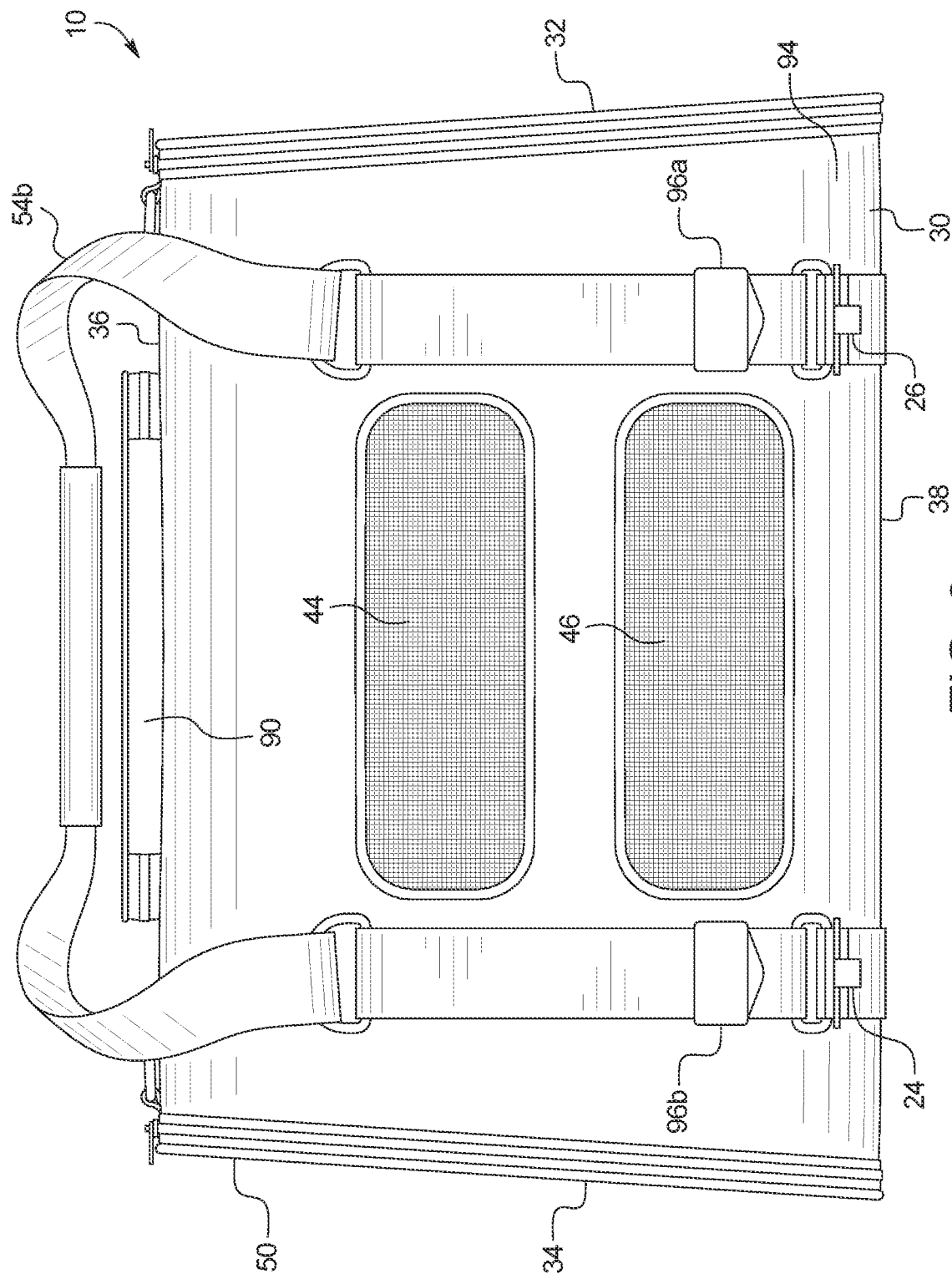
FIG. 3 is a rear elevational view of the pet carrier of FIG. 1.
Figure 4:
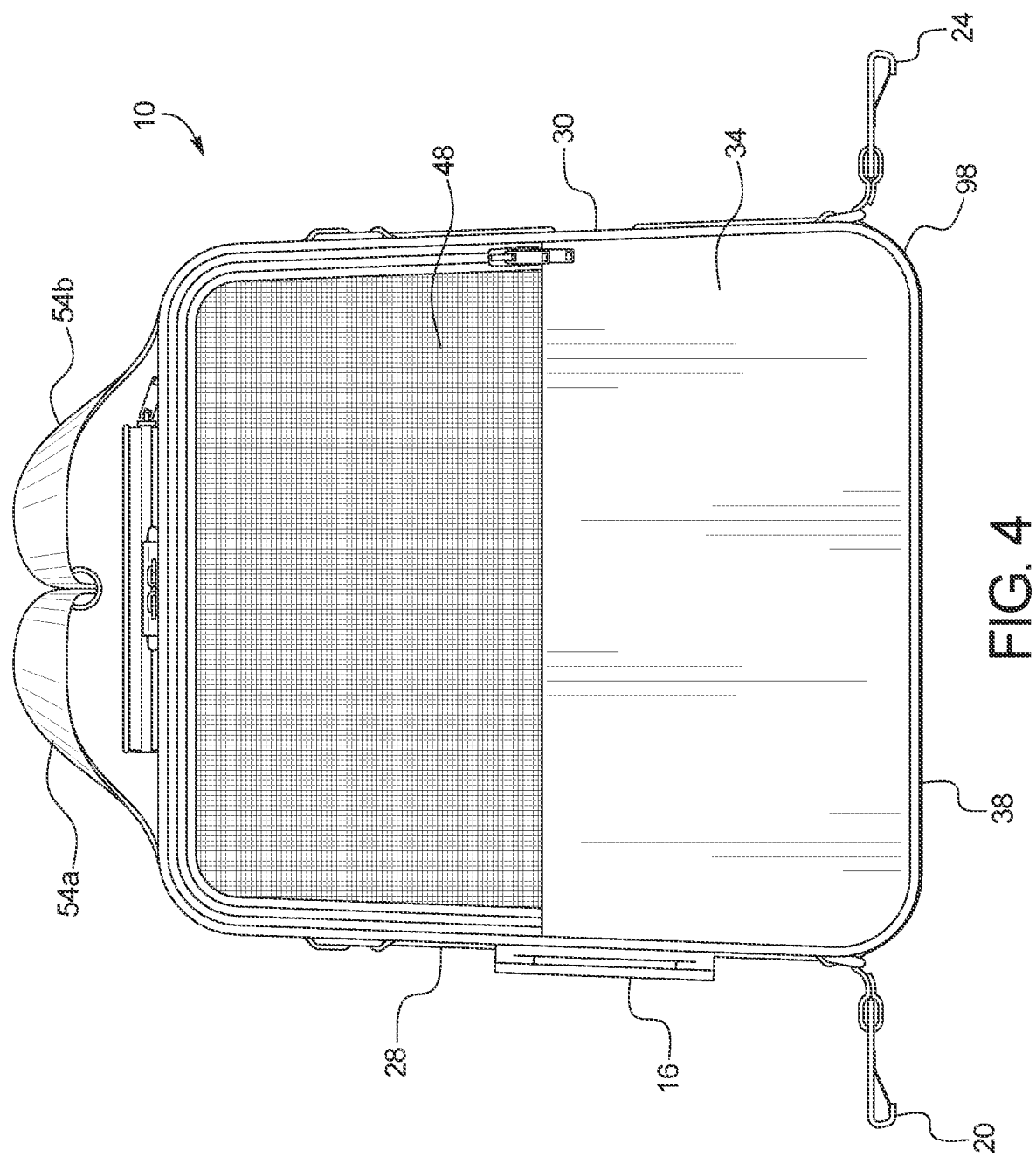
FIG. 4 is a side elevational view of the pet carrier of FIG. 1.
Figure 5:
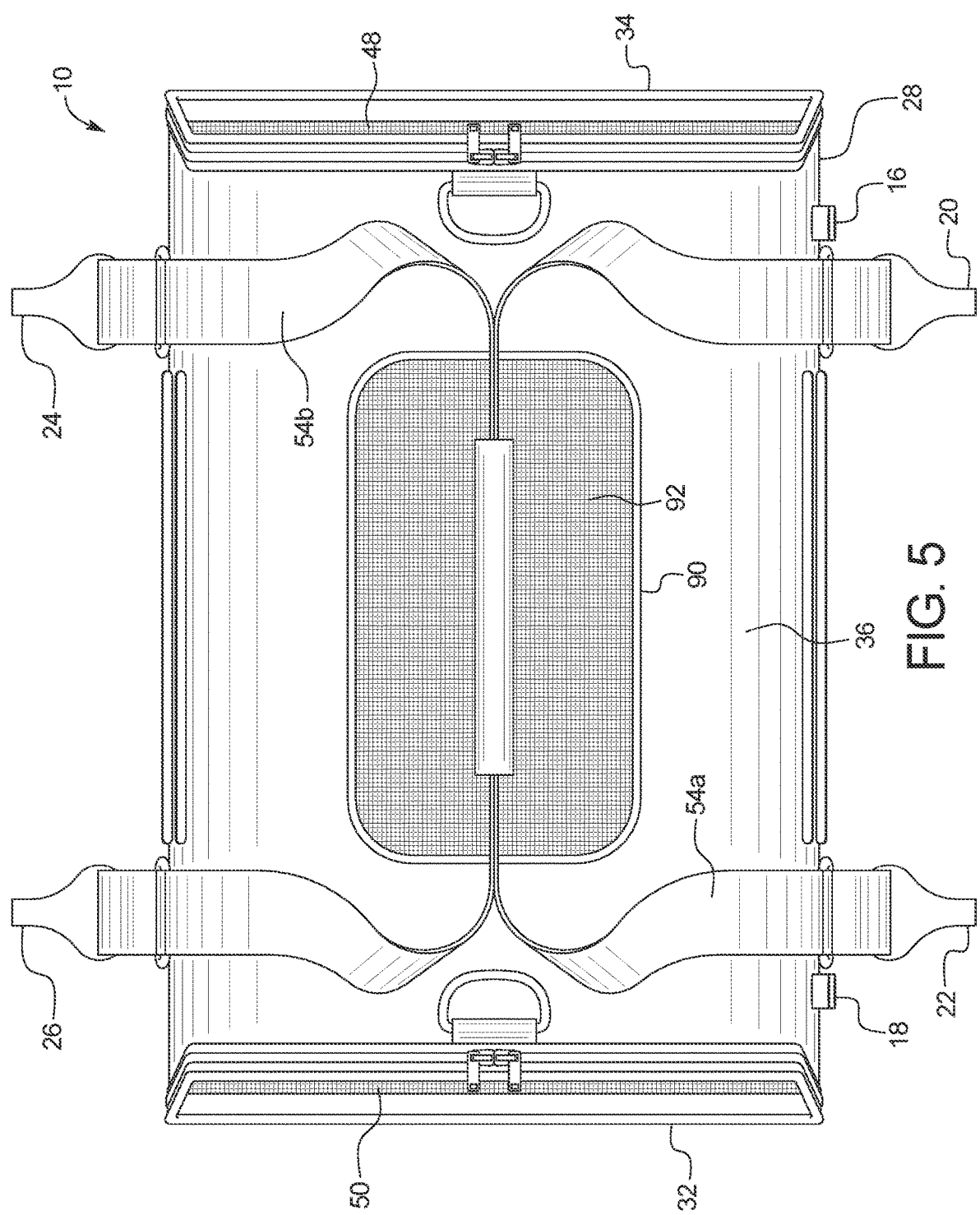
FIG. 5 is a top plan view of the pet carrier of FIG. 1.

The right end panel 34 can include a right end zippered mesh opening/egress structure 48, and the left end panel can include a left end zippered mesh opening/egress structure 50 (e.g., see FIGS. 1, 3 and 5). The left and right end zippered opening/egress structures 48 and 50 can be sized to permit placement and removal of a pet P from the carrier 10. Respective zippers 52 can permit opening or closing of the left and right end zippered opening/egress structures 48 and 50. Carry-straps 54a and 54b (tote handles) can be affixed to front side/backside panels 28 and 30 respectively and can be used to hold and carry the carrier 10 with or without a pet contained therein.

Figure 11:
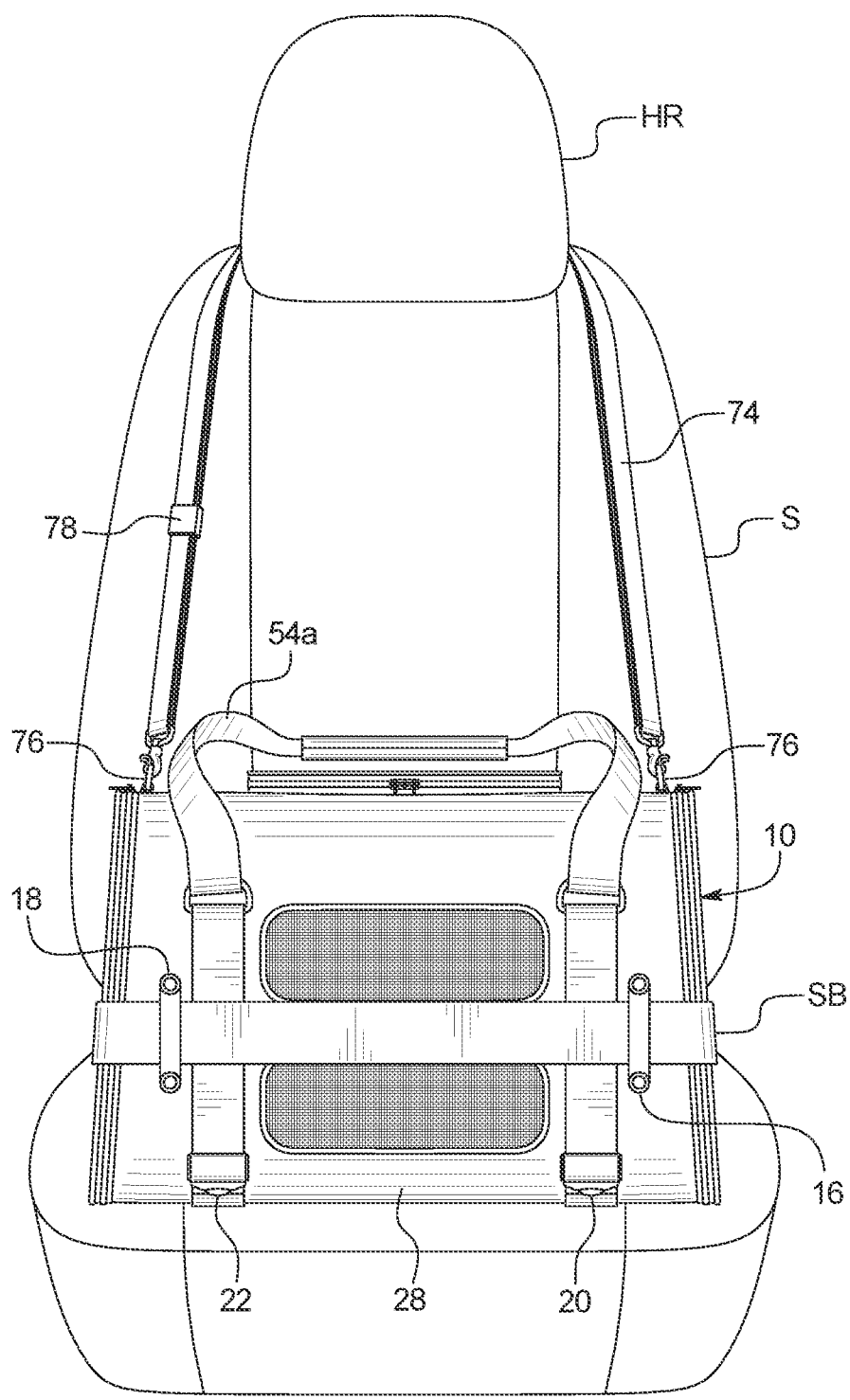
FIG. 11 is a front view of the carrier of FIG. 1 installed in a seat of a vehicle.
Figure 12:
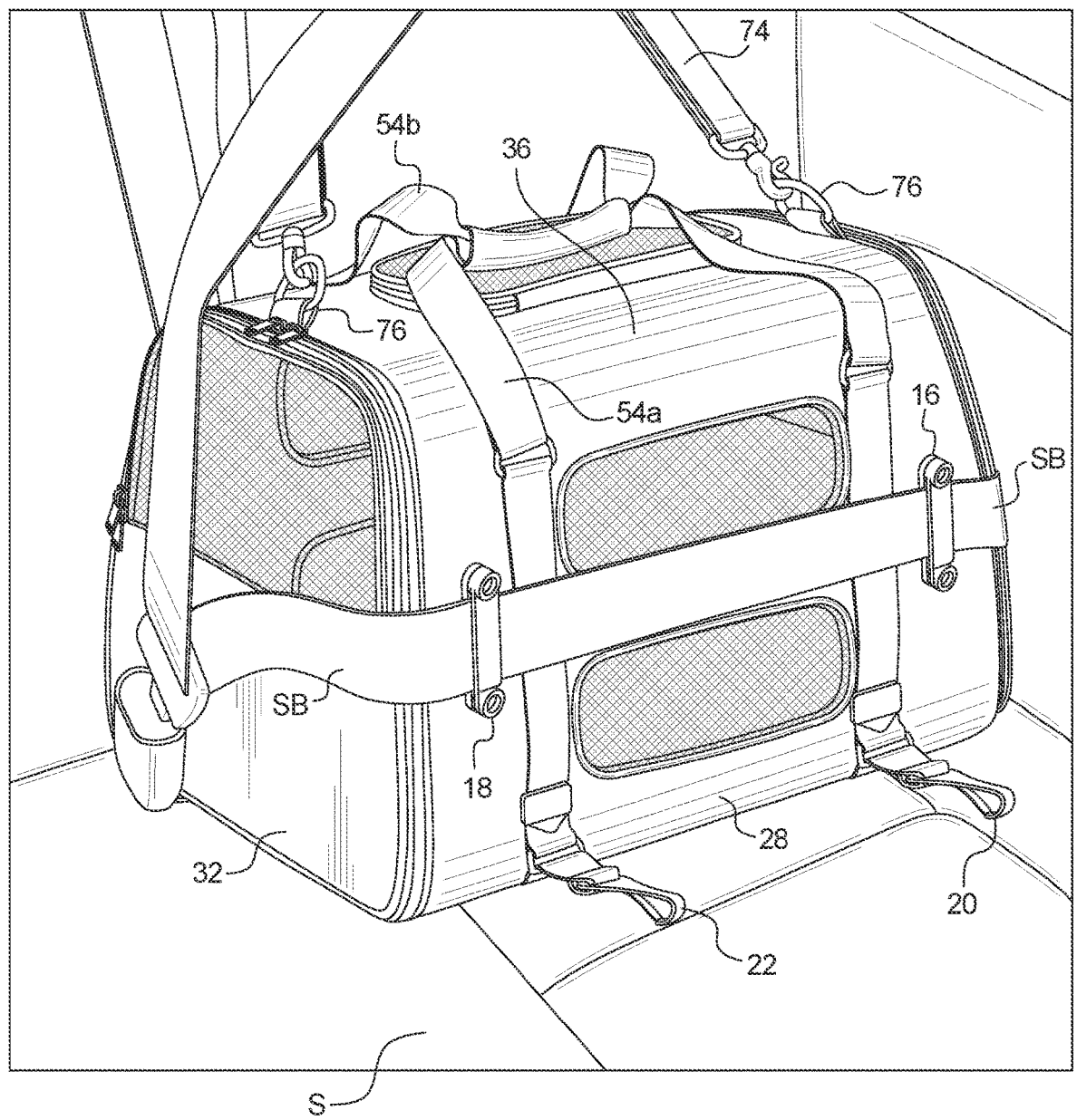
FIG. 12 is a front perspective view of the carrier of FIG. 1 installed in a seat of a vehicle.
Figure 13:
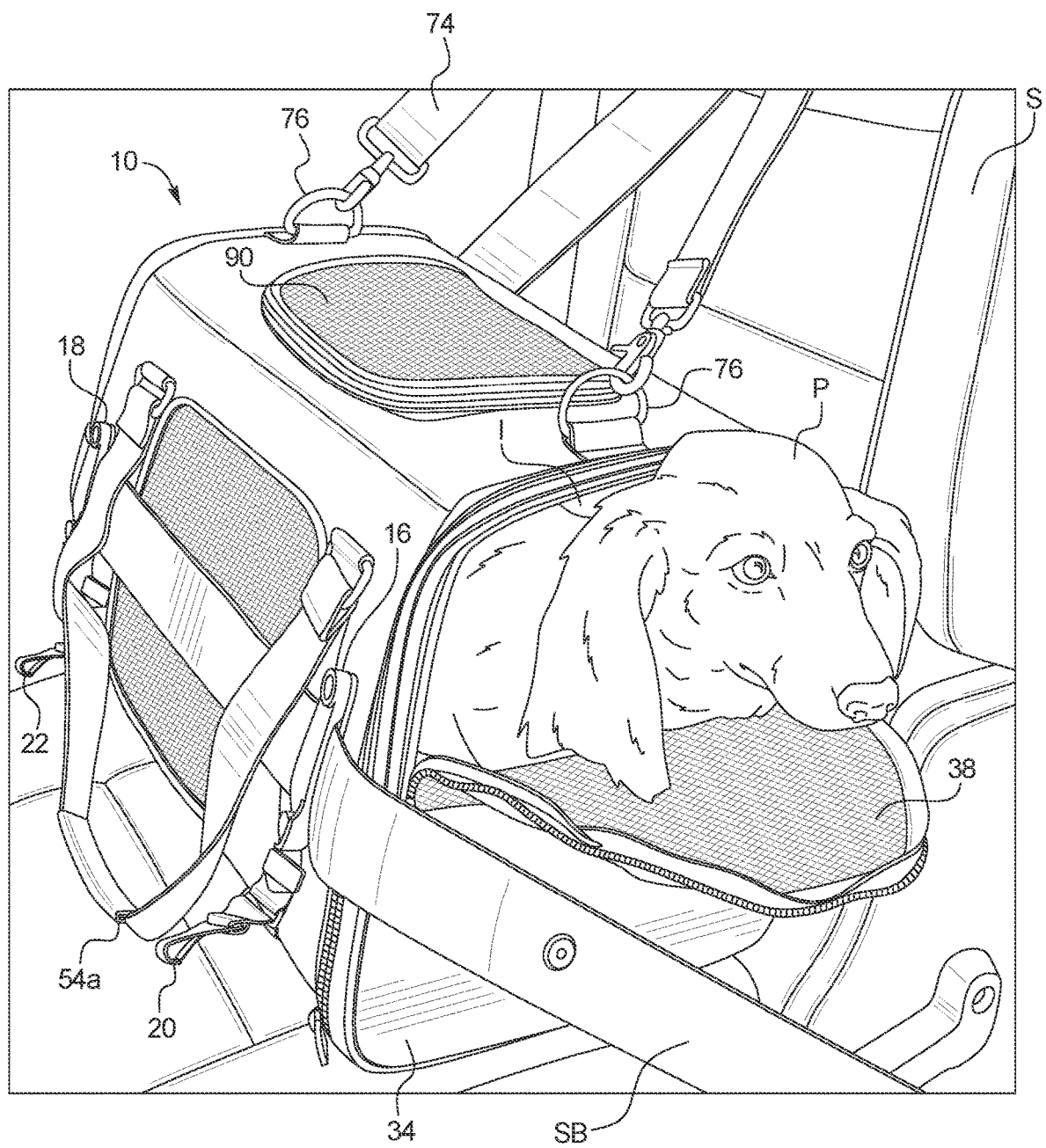
FIG. 13 is a front perspective view of the carrier of FIG. 1 installed in a seat of a vehicle and with a panel opened.
Figure 14:
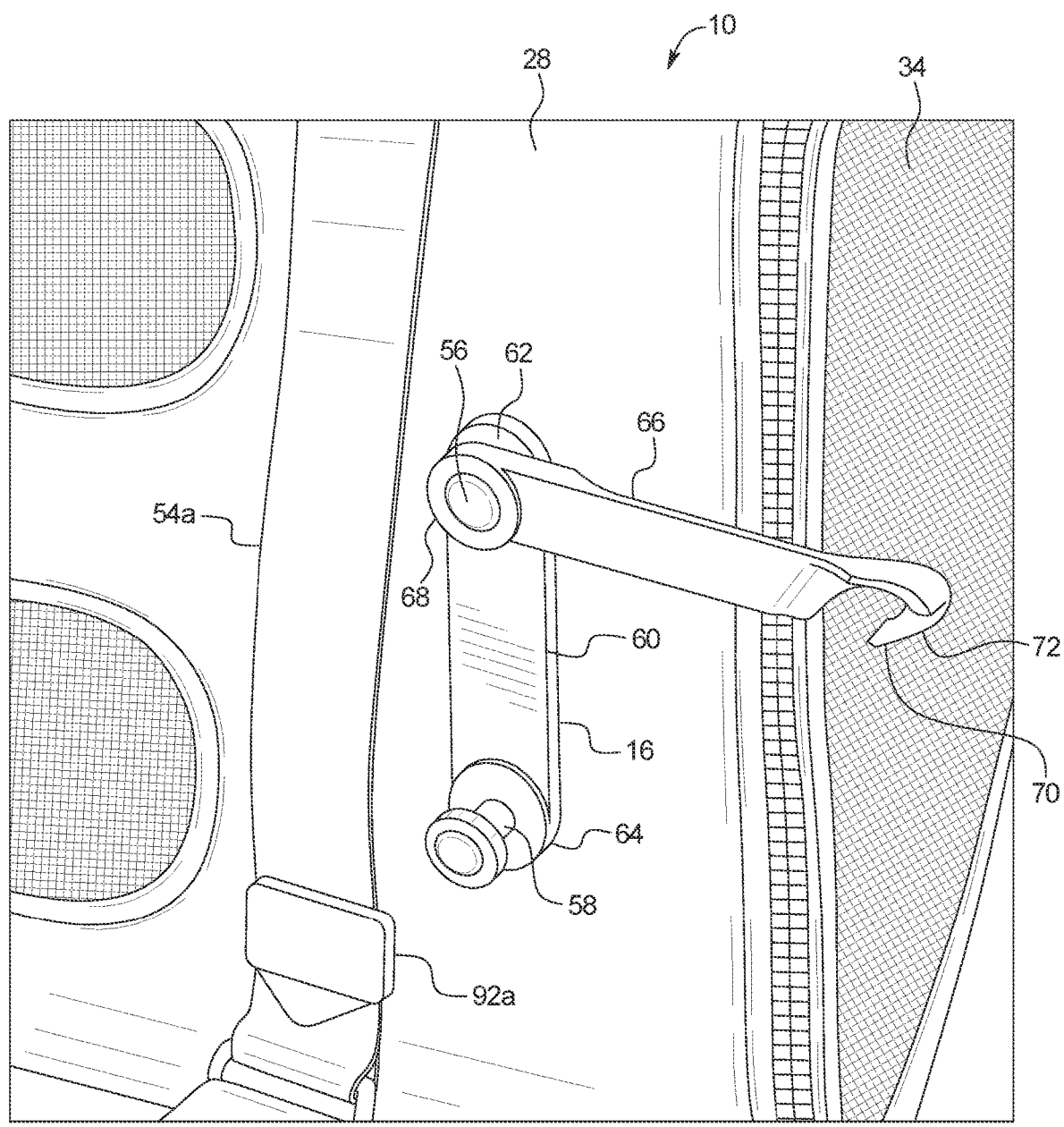
FIG. 14 is an enlarged view of the clip on the front panel of the carrier of FIG. 1 in an opened position.

Affixed to a surface of the front side panel 28 are spaced apart seat belt engagement structures or clips 16 and 18 that are configured to receive the seat belt SB, or the like, from the vehicle so as to secure the carrier 10 to a seat S within the vehicle (e.g. see FIGS. 11-13). As shown in FIG. 14, the clips 16 and 18 can include respective pivot posts 56 and anchor posts 58 to which inner arms 60 are affixed at their respective first ends 62 and 64. Inner arms 60 can be sized and configured to enable a seat belt SB, or the like, to overlie the inner arms 60 between the pivot posts 56 and the anchor posts 58. The outer rotatable arms 66 can be rotatably affixed at a first end 68 to a respective pivot post 58 so the arm 66 can rotate about the pivot post 56 to expose the inner arm 60 and facilitate placement, and removal, of a seat belt SB, or the like, over the inner arm 60. The opposing second ends 70 of the outer rotatable arms 66 can be configured to reversibly engage respective anchor posts 58. The outer rotatable arm 66 opposing second end 70 can include a hook structure 72, for example, which can be configured to engage respective anchor posts 58. As can be understood, while FIG. 14 only illustrates the clip 16, the clip 18 can have an identical configuration and any description of clip 16 applies to clip 18.

The clips 16 and 18 can be formed from plastic, such as engineered nylon, thermoplastic or a metal. For weight considerations, clips 16 and 18 can be composed of a plastic such an engineered nylon, or a light metal.

The fabric of the carrier 10 can be composed of a strong nylon such as 1680D ballistic nylon—a very strong fabric. For example, the tensile strength (ISO 13934-1) of the 1680D ballistic nylon is about 2976N warp, and about 2743N weft, with an abrasion strength (ISO 12947-2) of greater than about 50,000 cycles endpoints (cycles). In an exemplary comparison, a 600D fabric has about a 868N warp, and about a 700N weft, with an abrasion strength (ISO 12947-2) of about 25,000 cycles endpoints (cycles). The 1680D ballistic nylon also has a shiny effect when viewed so it appears as a more high-end, and therefore desirable, product to potential consumers. Further, the fabric can be knife resistant as it has a very high density and the yarn is very thick making the carrier 10 very durable and not easily damaged. The fabric knife resistance can also tend to resist being slashed, pierced or damaged by any other flying projectiles in the event of a vehicle accident/crash and/or rapid deceleration.

As shown in FIG. 11, the carrier 10 can include a top centered strap 74 that can also be a shoulder strap for carrying carrier 10 with or without a pet. The top strap 74 can be affixed at either end of the carrier by, for example, D-rings 76, and can be secured to a head rest HR to further secure carrier 10 within the vehicle. The strap 74 may include an adjustable portion 78 to lengthen/shorten the overall length of top strap 74, and which may be adjusted to put a predetermined strain on top strap 74 once carrier 10 is secured to vehicle seat S using seat belt SB. The top strap 74 can further limit lateral and forward movement of carrier 10. The D-rings 76 that attach the top strap 74 to the carrier 10 can enable the top strap 74 to be attached to any of the external surfaces of at least one panel and can be any structural coupling method, such as a fastening mechanism or clips. The top strap 74 can be made from traditional seatbelt webbing (e.g., a high strength nylon or polyester). The two ends of the top strap 74 can be separated by a predetermined distance for ease of coupling to a seat assembly. That is the top strap 74 can be placed over the head rest HR of the seat S. The top strap 74 an also be adjustable to be able to tightly fit over the seat S.

Figure 6:
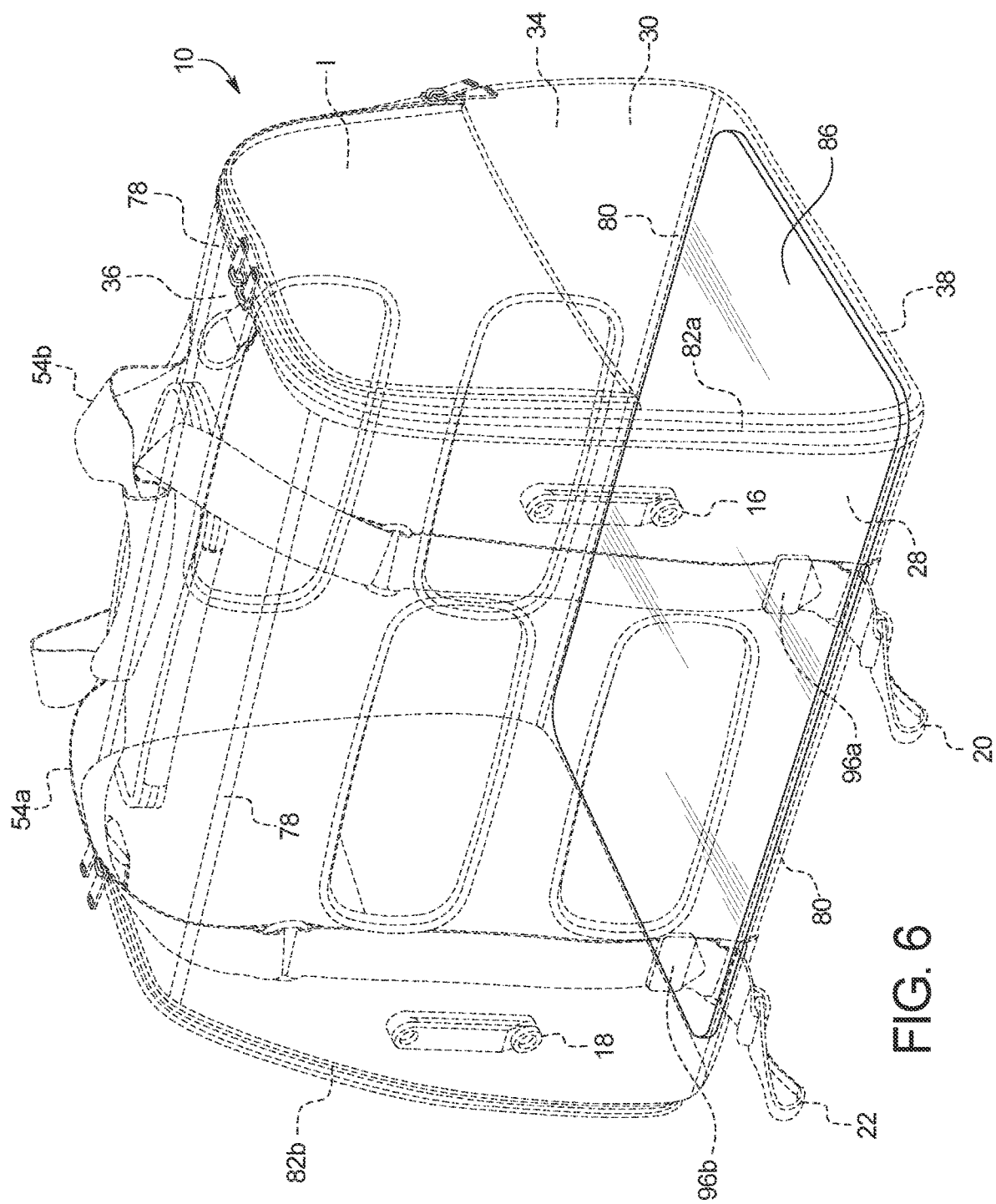
FIG. 6 is a translucent perspective view illustrating the frame structure of the carrier of FIG. 1.
Figure 7:
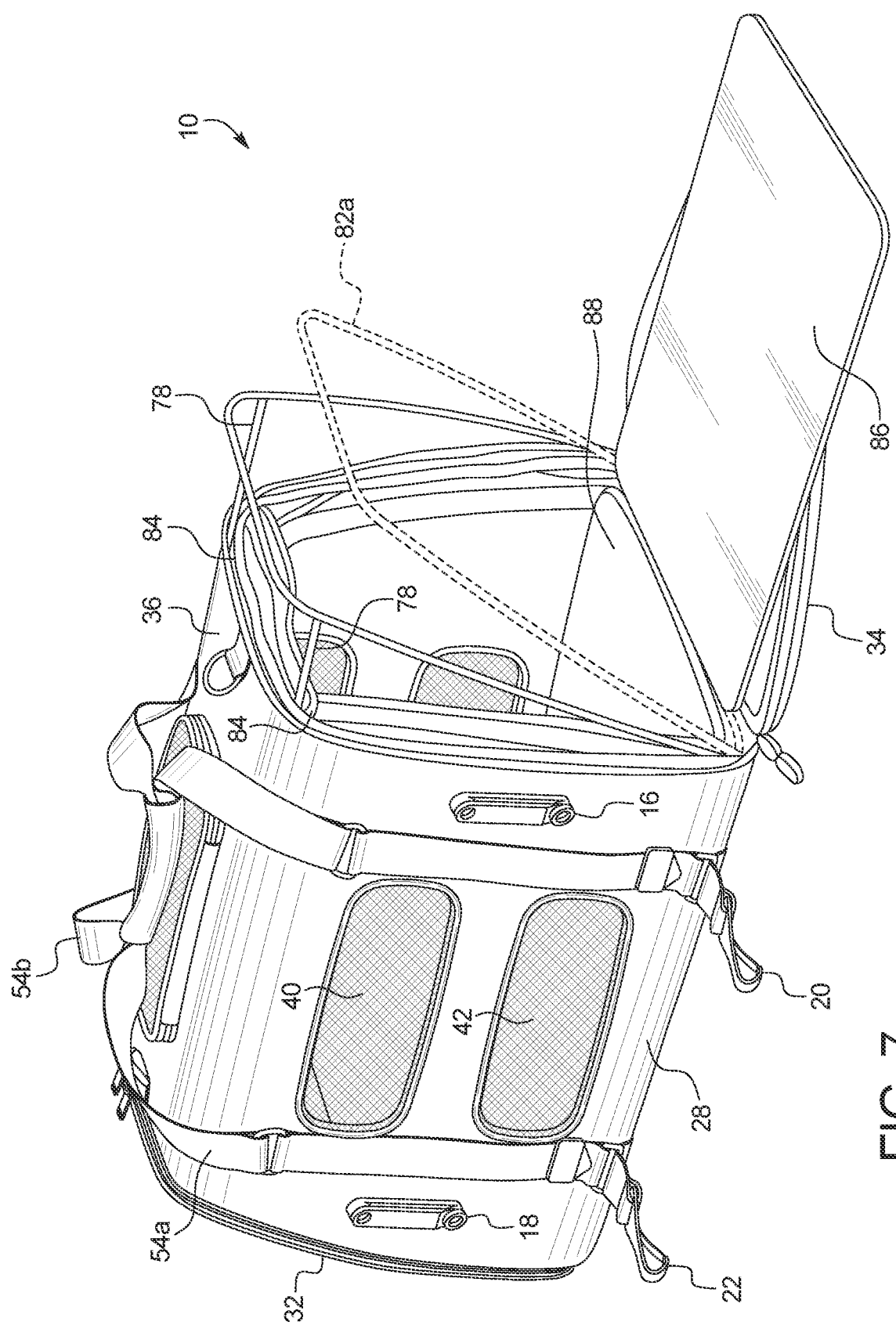
FIG. 7 is a top perspective view of the pet carrier of FIG. 1 illustrating the right zippered end opened with the right end wire frame being opened or closed in the right end.
Figure 8:
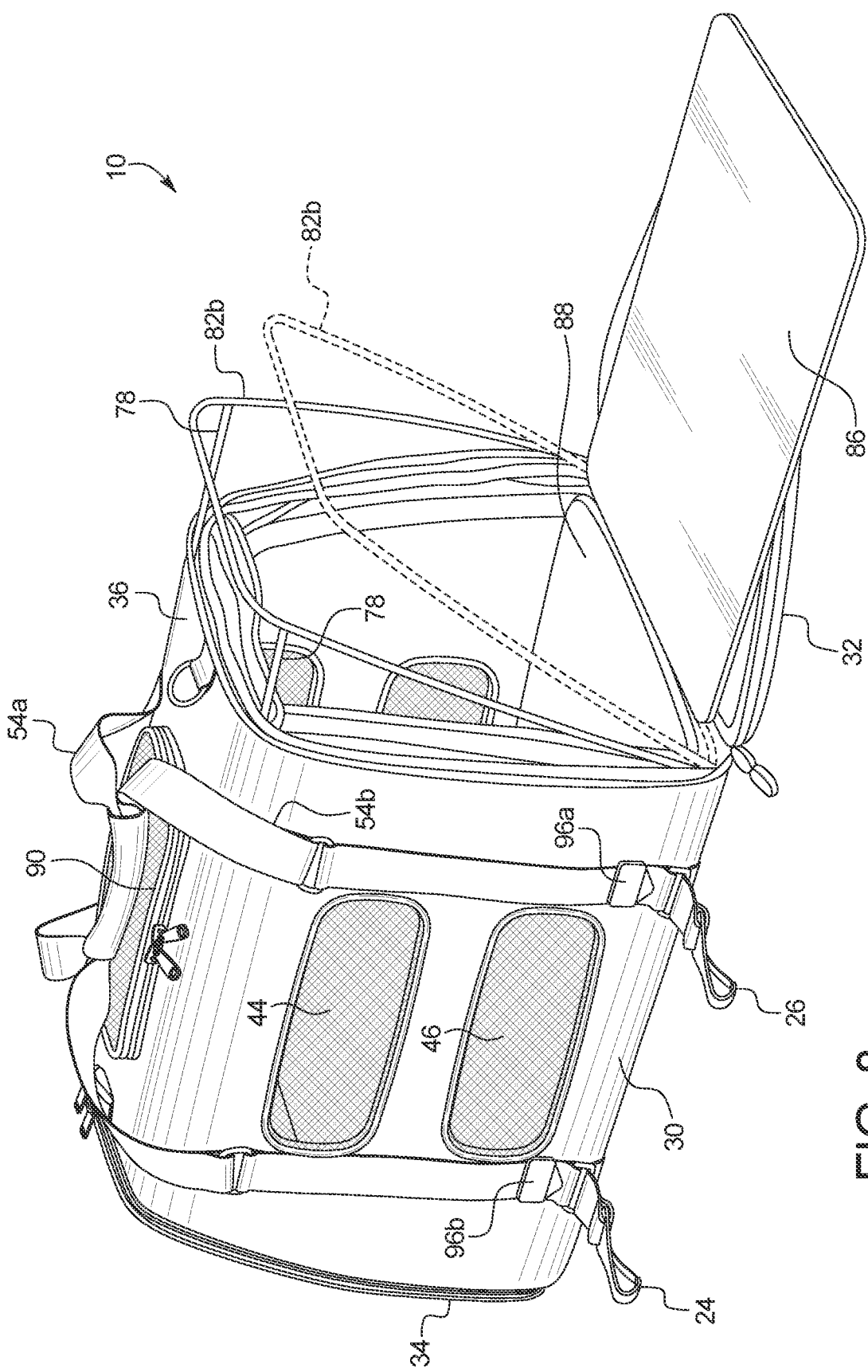
FIG. 8 is a top perspective view of the pet carrier of FIG. 7 illustrating the zippered end opened with the wire frame being opened or closed, and illustrating the transverse wire frame members partially extending out from carrier.
Figure 9:
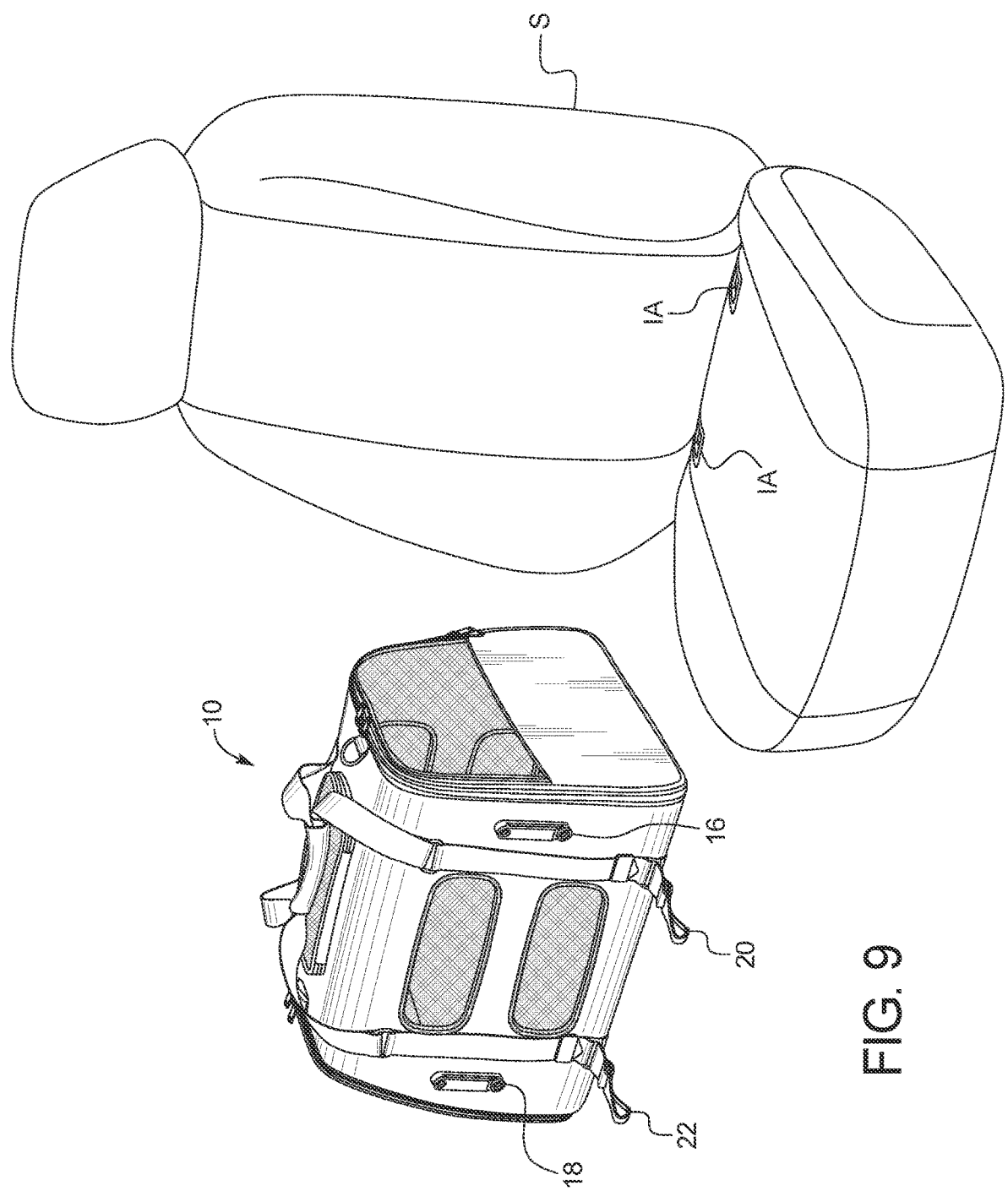
FIG. 9 is an exploded perspective view illustrating the carrier of FIG. 1 being attached to a seat in an vehicle.
Figure 10:
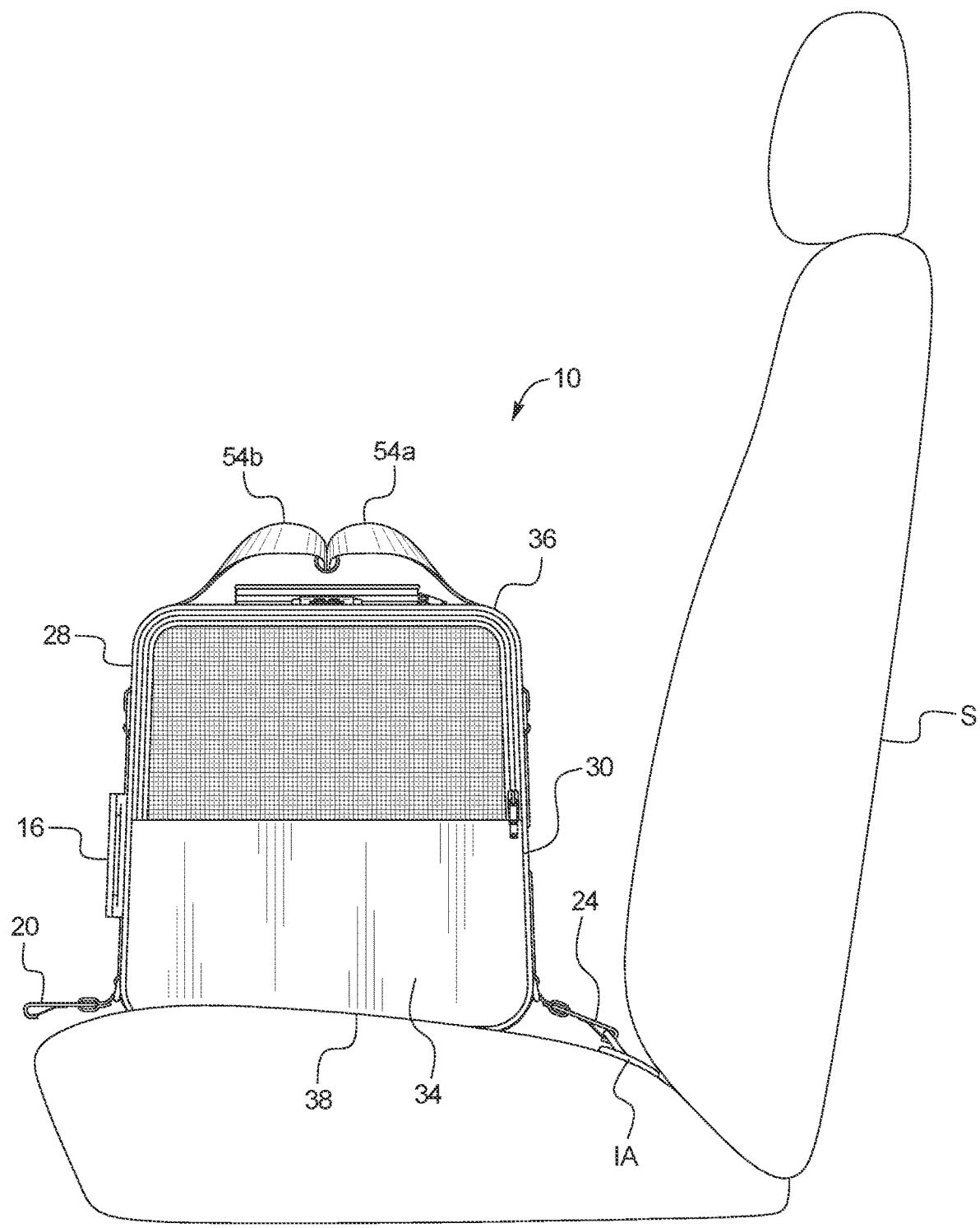
FIG. 10 is a side view illustrating the carrier of FIG. 1 with the iso clips attached to the iso clips of the vehicle.

As illustrated in FIGS. 6-8, in an exemplary embodiment of the present invention, carrier 10 can include at least a partial wire frame to maintain the structure of the carrier 10 during normal use as a carrier 10, and when strapped to a seat S in a vehicle (with FIGS. 7 and 8 illustrating different positions of the wire frame while being raised or lowered). The wire frame supports at least one of the panels, and in one embodiment, all of the panels (28-38), so as to maintain a shape of the interior I of the carrier 10.

Accordingly, in the embodiment in which the wire frame supports all the panels, the wire frame includes upper longitudinal wire sections 78, lower longitudinal wire sections 80, and left- and right-hinged wire end sections 82a and 82b. The hinged wire end sections 82a and 82b pivot at their respective lower base and can fold down to permit the carrier 10 to collapse for storage. The wire frame can be disposed within tunnels 84 or openings in the fabric of the carrier 10. In one embodiment, the tunnels 84 can be closed in the longitudinal direction using a hook and loop fastener system, such as VELCRO. In this embodiment, the tunnels 84 can be selectively opened to enable the wire frame to be more easily removed and/or inserted into the carrier 10. When the carrier 10 is raised, each left- and right-hinged wire end section 82a and 82b can be raised and held in place by, for example, hook and loop structures overlying each upper horizontal wire portion to form the carrier 10 for a pet.

As shown in FIGS. 6-8, the carrier 10 can include a lower, interior removable pad 86 that is easy to clean and is machine washable, and a short lease (not shown) affixed to the interior compartment to ensure a pet stays within the carrier 10 regardless of which zippered mesh is opened. The pad 86 can be made from any fabric and can form a shell that encloses a cushion. The pad 86 can be placed on a top surface 88 of the bottom panel 38 within the carrier 10 to provide improved comfort to the pet when inside the carrier 10. The pad 86 can additionally include an absorbent layer or material to absorb liquids and protect the upholstery of the seat on which the carrier 10 is placed. The pad 86 can also include a feature to allow for detachable coupling to one or more panel (e.g., a hook and loop fastener, snaps, buttons, zippers etc.). The pad 86 can be removable from the carrier 10 for cleaning or other purposes of utility.

The top surface or panel 36 can include a pocket 90. The pocket can be formed by a mess portion that is closed by a zippered lid 92.

The carrier includes iso clips 20-26 that are configured to attach to or couple to one of the Isofix anchors IA or attachment points of a vehicle seat S, which are typically positioned in the split line of the seat (i.e., between the seat cushion and the seat back). The iso clips 24 and 26 are preferably disposed at a rear portion 94 of the carrier to enable easy attachment to the Isofix anchors IA on the seat S. In one embodiment, each iso clip 20-26 can be attached to the straps 54a and 54b the extends around the front 28 and rear 30 panels of the carrier 10. Each strap 54a and 54b also includes an adjuster 96a and 96b that enables adjustment of the strap 54a and 54b so as to properly and tightly fit the carrier 10 to the seat S of the vehicle. The iso clips 20-26 can be one of a variety of mechanisms that suitably couple each strap 54a and 54b to the Isofix anchos IA. For example, the iso clips 20-26 can be hooks (e.g., an open hook, a clip, hook with a spring-loaded closure, etc.) that is configured to engage a rigid U-shaped wire anchor located in the vehicle. For example, the clips 20-26 can have a rounded configuration with a spring loaded tongue that enables access into the interior of internal part of the rounded portion of the clip. Thus, as can be understood, the rounded portion of the clip 20-26 can surround or substantially surround the Isofix anchor IA. The iso clips 20-26 can also be an alligator-like clip with a pair of opposing, spring-loaded jaws. Additionally, the iso clips 20-26 can be an anchor ring and be configured to engage a hook or clip coupled to the seat S. Preferably, in one embodiment, the clips 24 and 26 are attached to or adjacent the bottom panel 38 or rear panel 30 of the carrier 10, or one of the left and right panels 32 and 34 adjacent or near the bottom panel 38 and/or rear panel 30. For example, the clips 24 and 26 can be disposed at or adjacent the bottom rear corner 98 of the carrier 10. This position enables the bottom panel 38 of the carrier to be tightly coupled to the Isofix anchors IA in the vehicle. Further, positioning the clips 24 and 26 at the rear portion 94 of the carrier 10, enables the Iso anchors IA to prevent movement of the carrier 10, while also avoiding possible compression of the interior I or the carrier 10.

Figure 15:
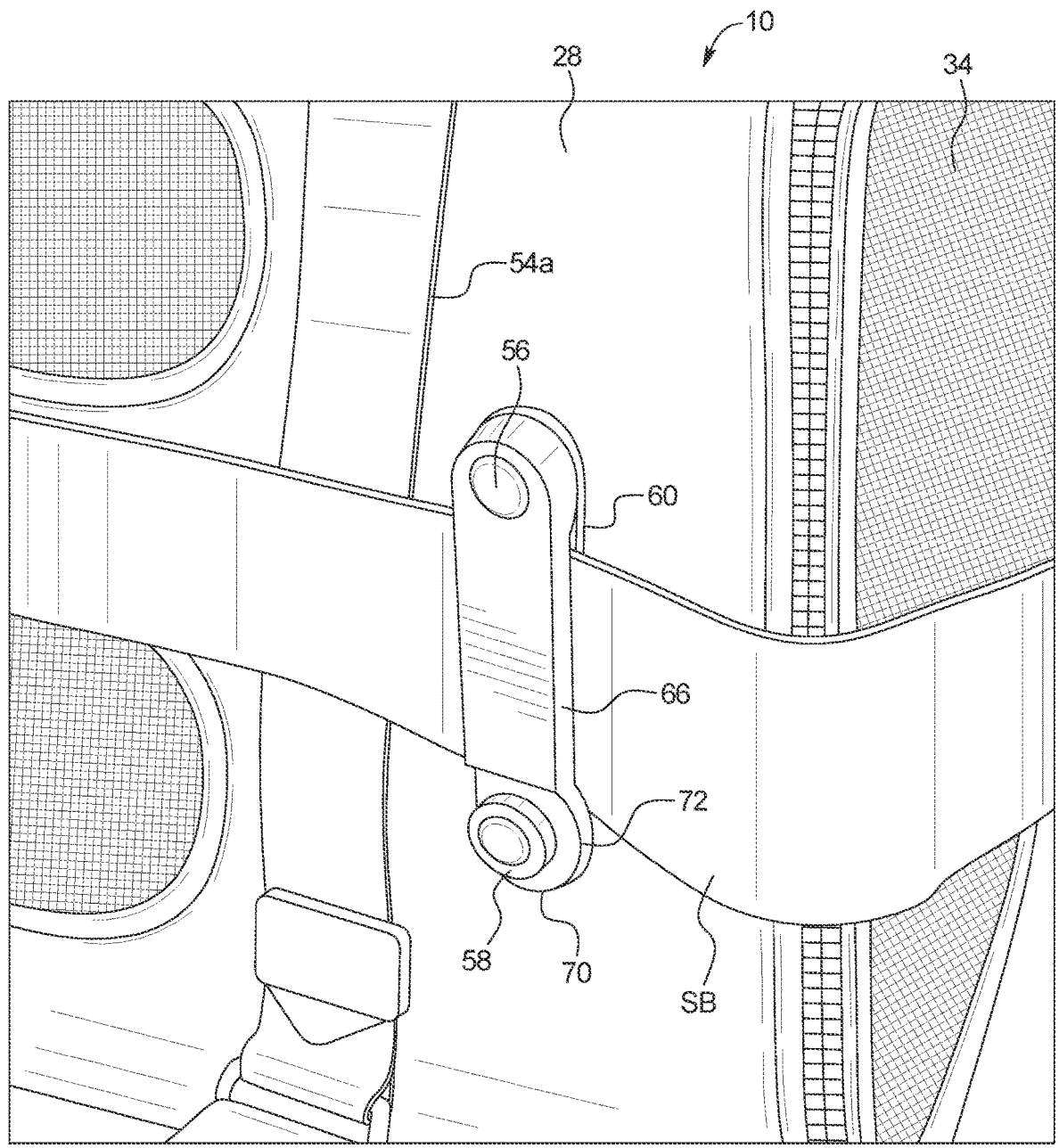
FIG. 15 is an enlarged view of the clip on the front panel of the carrier of FIG. 1 in an closed position and securing the seat belt of the vehicle to the carrier.
Figure 16A:
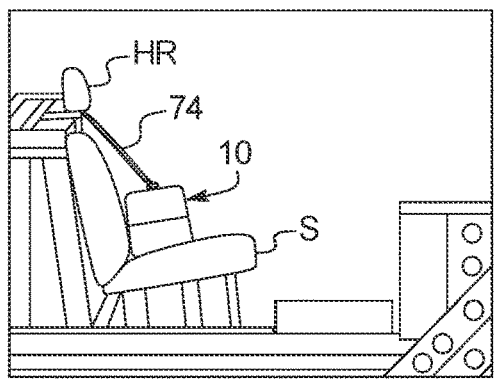
FIGS. 16A-16H illustrate the carrier of FIG. 1 being tested.
Figure 16B:
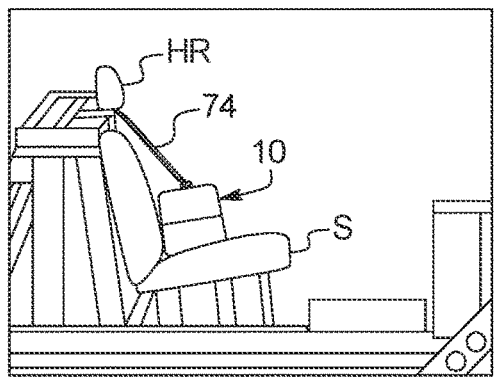
Figure 16C:
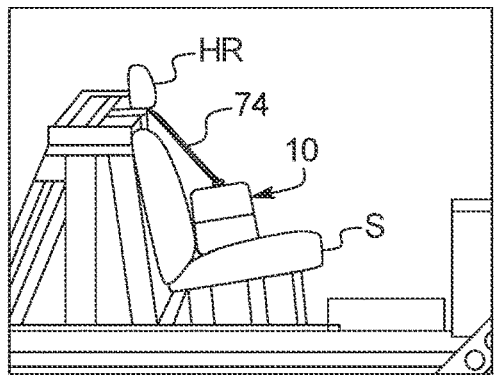
Figure 16D:
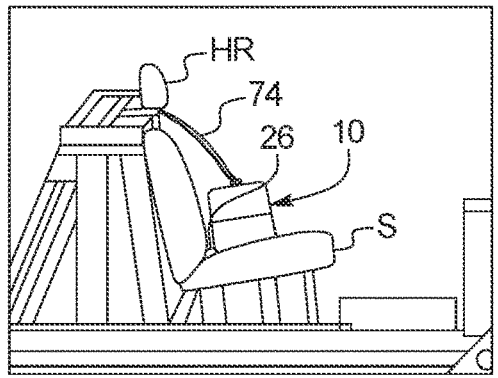
Figure 16E:
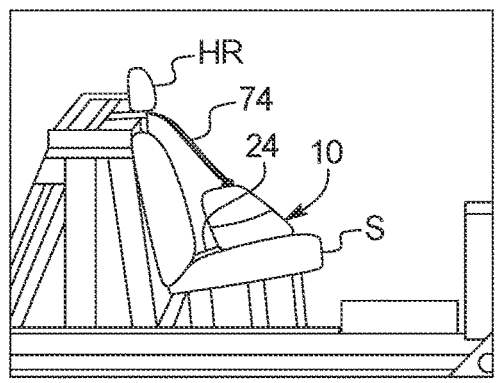
Figure 16F:
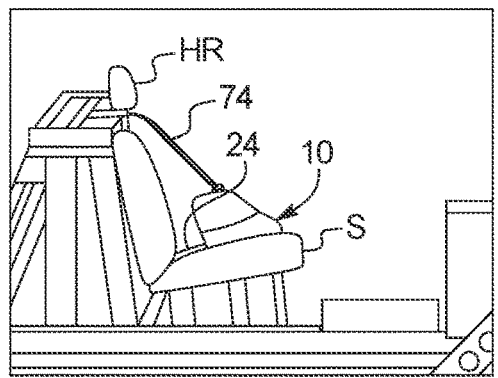
Figure 16G:
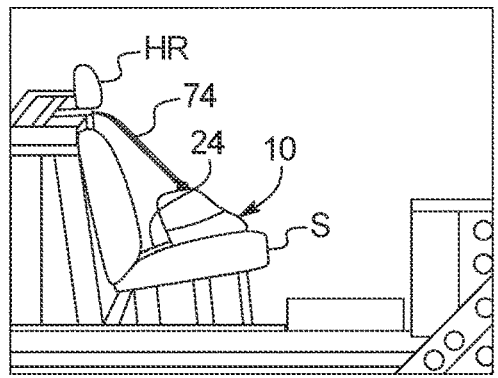
Figure 16H:
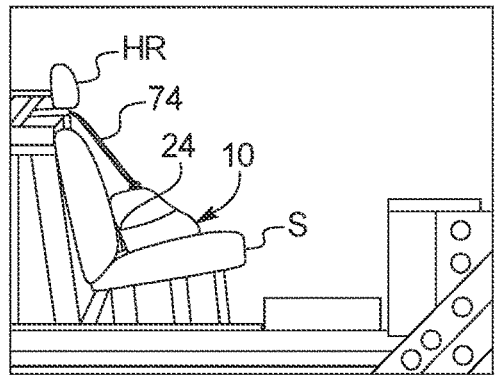
Figures 17A, 17B:
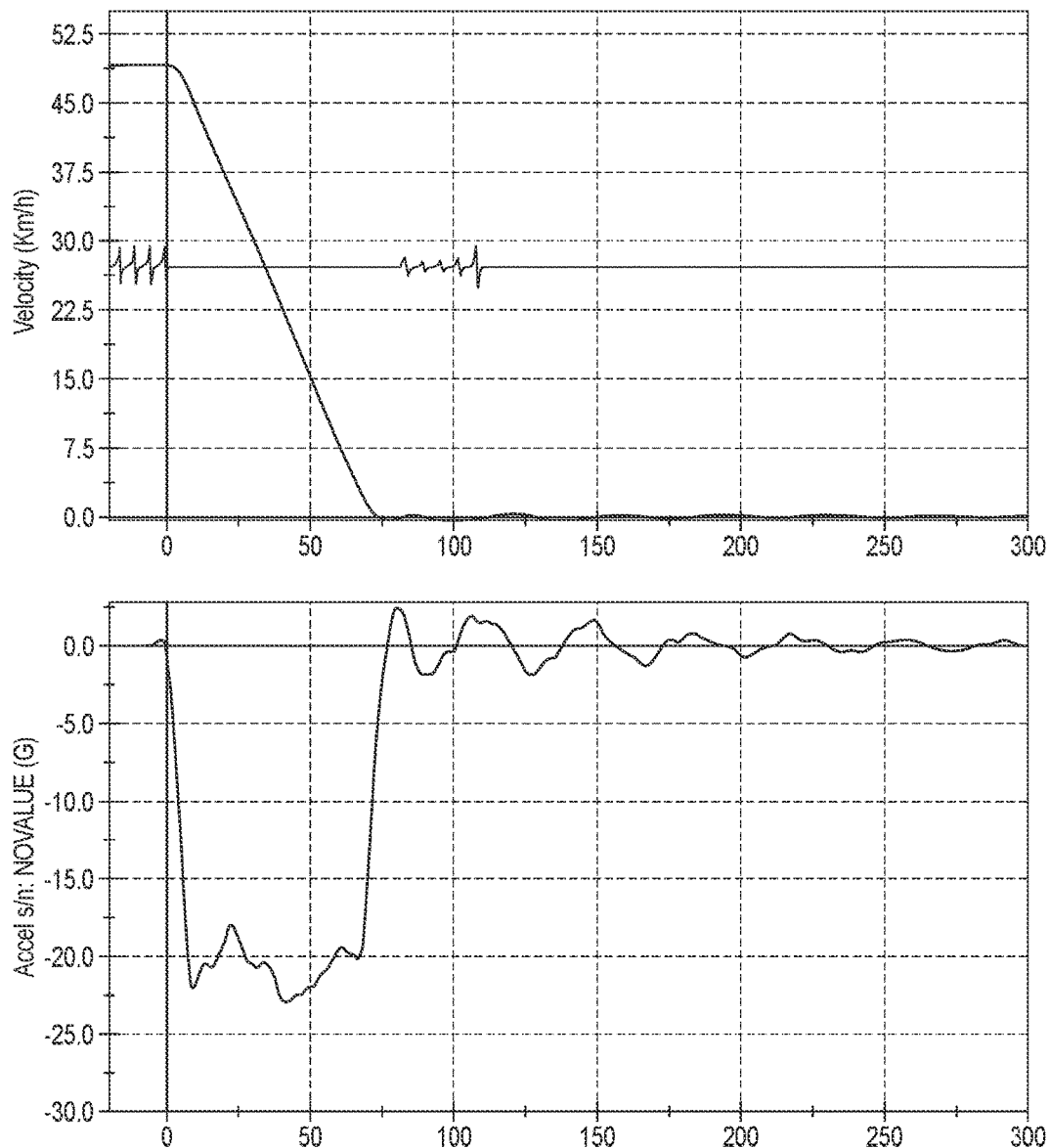
FIGS. 17A and 17B illustrate test results from the tests illustrated in FIGS. 16A-16H.
Figure 18A:
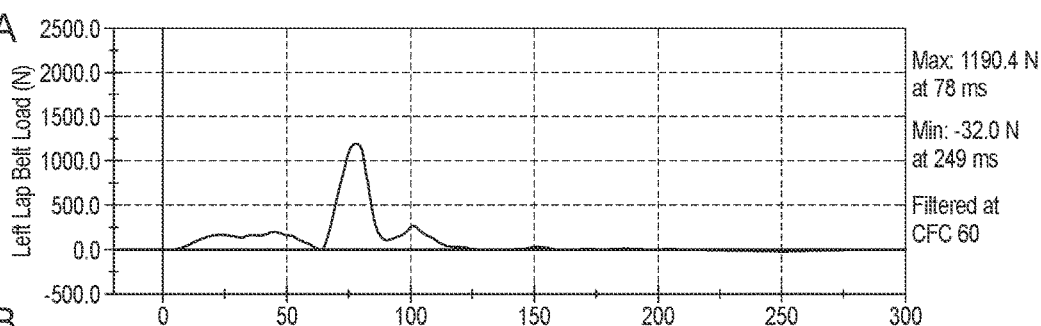
FIGS. 18A-18D illustrate loads the carrier of FIG. 1 experiences during the tests illustrated in FIGS. 16A-16H.
Figure 18B:
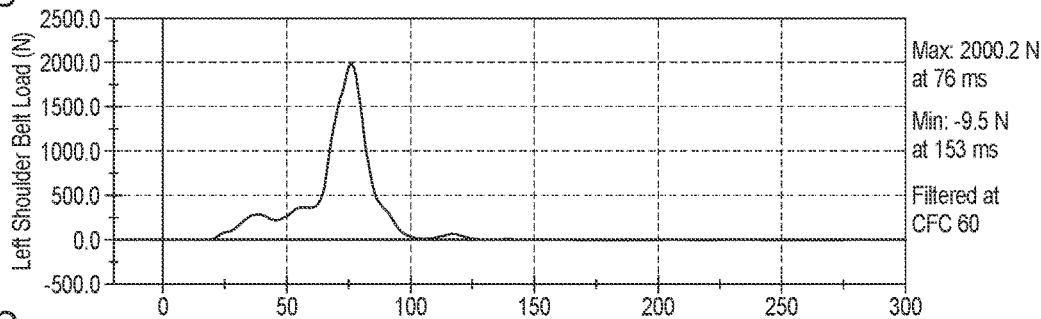
Figure 18C:
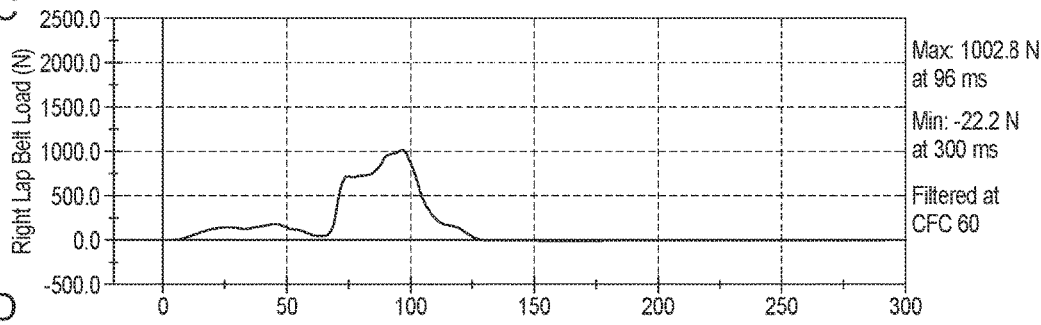
Figure 18D:
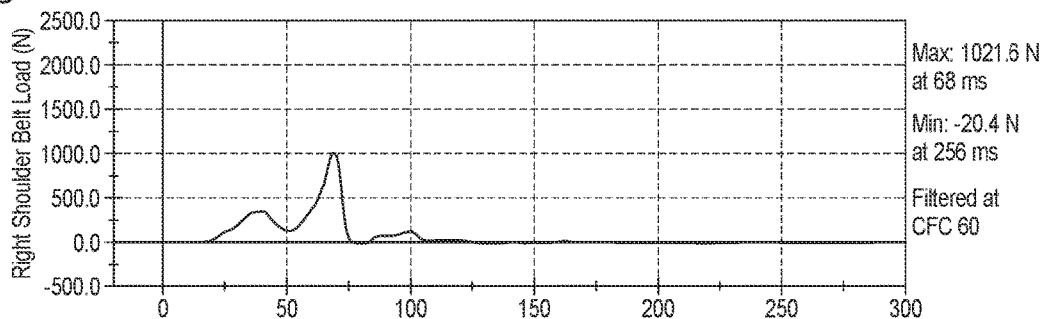

As shown in FIG. 9-15, the carrier 10 can be positioned on the seat S of the vehicle. Generally, the iso clips 24 and 26 on the rear panel 30 or bottom panel 38 of the carrier 10 are attached to the Isofix anchors IA in the seat S of the vehicle, see FIGS. 9 and 10. As shown in FIGS. 11-13, the seat belt SB can then be positioned around the carrier 10 and over the plastic clips 16 and 18. As can be understood, the rotatable arms 66 on the clips 16 and 18 are rotated to a position that enables the seat belt SB of overlie the arms 60, as shown in FIG. 14. The rotatable arms 66 are then rotated in a position such that the seat belt is disposed between the arms 60 and the rotatable arms 66, as shown in FIG. 15. The hooks 72 of the rotatable arms 66 are then locked to the posts 58. FIG. 11 illustrates the carrier 10 in the center seat position, while FIGS. 12 and 13 illustrate the carrier 10 in the left and right seat positions, respectively. As shown in FIG. 13, the carrier 10 is capable of have a panel unzipped to enable the pet P to at least partially protrude from the interior I of the carrier 10. As noted above, enabling the pet P to at least partially protrude from the interior I of the carrier 10 enables the pet P to more clearly view their surroundings, feel less confined and allows the pet P to be petted and/or comforted.

Moreover, the strap 74 can be positioned and tightened around the seat S or the head rest HR of the seat S. In one embodiment, the strap 74 can be configured such that it can be clipped to the anchor on the rear surface of the seat S of the vehicle. In either embodiment, the strap 74 can have an adjustable portion 78 that enables the strap 74 to be tightly and securely affixed, further reducing the possibility of movement of the carrier 10.

A pet can be placed inside the carrier 10 coupled to the seat S to limit the movement of the pet to the confines of the interior I of the carrier 10. The pet having mobility inside the carrier 10 offers comfort to the pet, yet the restraint of movement by the carrier 10 limits the distractions created by the pet to the driver of the vehicle. A pet having unrestrained movement inside the vehicle can create driver distractions (e.g., contacting the driver, protruding through the window), which could lead to an accident or incident, such as a vehicle dynamic impact event.

As shown in FIG. 16A-16H, during a vehicle dynamic impact involving a pet P inside a carrier 10, the mass of the pet P being decelerated with the vehicle creates a force substantially in the forward direction (for a frontal impact) or substantially in the rearward direction (for a rearward impact). The forward force can displace the pet P toward the front of the vehicle and away from the seat S to which the carrier 10 is coupled, causing the pet P to impact the front panel 36 of the carrier 10. The frame member such as a wire or rod around the periphery of the panel adds structural integrity to the panels, retaining the pet P and restraining the displacement of the pet to the interior volume of the carrier 10. The forward force of the pet P into the carrier 10 puts the clips 24 and 26, the seatbelt SB extending over or through the clips 16 and 18 holding the seatbelt SB, and the strap 74 around the seat S in tension between, transferring the loads into the seat S and thus limiting the displacement of the carrier 10 to the displacement of the seat S plus any stretch of the strap. A rearward force in a rear impact can displace the pet and the carrier 10 toward the seat S the carrier 10 is coupled to, thereby loading directly into the seat S by distributing the load across the surface of the seat S. It is noted that FIGS. 16A-16H exaggerate any movement of the carrier 10 for ease of explanation and understanding and is not meant to be representative of the exact motion of the carrier in an accident or any other situation.

Thus, as shown in FIGS. 17A-17B and 18A-18D, the pet can be subjected to significant forces during a collision. The embodiments of the carrier 10 described herein reduce the potential injury to the pet by limiting the displacement of the pet and reducing the likelihood the pet contacts other vehicle components which could create impact and force concentrations on the pet. Additionally, the carrier 10 reduces injury to the pet by distributing the loading from the dynamic event over a relatively large portion of the pet from contacting one or more than one panel of the carrier 10. The carrier 10 also reduces the potential injury to vehicle occupants by restraining the pet and reducing the likelihood that the pet will contact the occupant or the seat of the occupant during the dynamic vehicle event. This can be seen in the pet restrain system test results included herewith.

It should be noted that a carrier 10 as described in this application also reduces the potential of the pet to be ejected from the vehicle during a dynamic impact event, including a rollover event of the vehicle. During impact events of the vehicle which induce the vehicle to roll over, forces likely can induce the unrestrained pet to displace in substantially upward and outward directions, creating a situation for ejection from the vehicle. By confining the pet to the interior of the carrier, the likelihood of ejection of the pet is reduced. The carrier 10 also retains the enclosed pet following a dynamic impact event, which makes it easier and safer for emergency response personnel to administer first aid to injured vehicle occupants.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "portion," "member" or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A carrier for an animal, the carrier comprising:
a plurality of panels configured to form an enclosure for the animal, the panels including a front side panel, a backside panel, a left end panel, a right end panel, a top panel and a bottom panel;
a wire frame supporting at least one of the panels so as to maintain a shape of the enclosure;
a locking clip on a surface of the carrier, the clip including a rotating locking arm for securing a belt portion of a seat belt of a vehicle; and
an iso clip configured to couple to an isofix anchor of the vehicle, the iso clip being positioned on at least one of the front side panel and the backside panel at a location adjacent to the bottom panel.

2. The carrier of claim 1, further comprising
a strap configured to connect the carrier to the vehicle, the strap including a first fastening mechanism at a first end and a second fastening mechanism at a second end.

3. The carrier of claim 2, wherein one of the first and second fastening mechanisms comprises a clip or a hook configured to connect to the carrier.

4. The carrier of claim 1, wherein
the wire frame is one of a plurality of wire frames and each wire frame of the plurality of wire frames is integrated into of one of the panels along a periphery of a respective panel.

5. The carrier of claim 1, wherein
at least one panel of the plurality of panels includes a porous material and a non-porous material and the porous material is configured to permit a flow of air into and out of the enclosure and to permit visibility of the animal disposed in the enclosure.

6. The carrier of claim 5, wherein
the porous material includes mesh fabric and the non-porous material includes nylon or polyester.

7. The carrier of claim 1, wherein
the wire frame comprises a wire or a rod.

8. The carrier of claim 1, wherein
the iso clip is attached to an adjustable strap.

9. The carrier of claim 1, further comprising a door configured to enable the animal to enter and exit the carrier.

10. A method of securing a carrier within a vehicle, the method comprising:
attaching an iso clip disposed at a bottom rear portion of a side panel of the carrier to an iso anchor of the vehicle;
securing a seat belt portion of the vehicle around a front panel of the carrier; and
locking a clip on the carrier to secure the seat belt portion to the carrier, wherein the locking the clip includes rotating a locking arm so as to overlie the seat belt portion of the vehicle.

11. The method of claim 10, further comprising
connecting a strap of the carrier to the vehicle, the strap including a first fastening mechanism at a first end and a second fastening mechanism at a second end.

12. The method of claim 10, wherein
the front panel of the carrier includes a wire frame integrated into the front panel along a periphery thereof.

13. The method of claim 12, wherein
the wire frame comprises a wire or a rod.

14. The method of claim 10, wherein
the front panel includes a porous material and a non-porous material and the porous material is configured to permit a flow of air into and out of the enclosure and to permit visibility of the animal disposed in the enclosure.

15. The method of claim 14, wherein
the porous material includes mesh fabric and the non-porous material includes nylon or polyester.

16. The method of claim 10, further comprising
adjusting the iso clip with an adjustable strap.

17. The method of claim 10, further comprising
opening a door in a side panel to enable an animal to enter and exit the carrier.

* * * * *